United States Patent [19]

Uroshevich

[11] 4,273,105
[45] Jun. 16, 1981

[54] SOLAR ENERGY COLLECTOR

[75] Inventor: Miroslav Uroshevich, Cincinnati, Ohio

[73] Assignee: Alpha Solarco Inc., Cincinnati, Ohio

[21] Appl. No.: 52,082

[22] Filed: Jun. 25, 1979

[51] Int. Cl.³ .............................................. F24J 3/02
[52] U.S. Cl. .................................... 126/443; 126/447; 126/450
[58] Field of Search ............... 126/417, 432, 442, 446, 126/450, 443; 313/22, 2, 30, 288, 289, 244

[56] References Cited

U.S. PATENT DOCUMENTS

| 3,599,026 | 8/1971 | Tsuneta | 313/30 X |
|---|---|---|---|
| 4,048,982 | 9/1977 | Pei | 126/450 X |
| 4,055,707 | 10/1977 | McDonald | 126/901 X |
| 4,069,810 | 1/1978 | Tabor | 126/443 |
| 4,069,811 | 1/1978 | Tabor | 126/446 X |
| 4,183,351 | 1/1980 | Hinotani et al. | 126/443 |
| 4,192,292 | 3/1980 | Root | 126/448 |

FOREIGN PATENT DOCUMENTS 2518926  11/1976  Fed. Rep. of Germany ........... 126/443

Primary Examiner—James C. Yeung
Assistant Examiner—Larry Jones
Attorney, Agent, or Firm—Gary M. Gron

[57] ABSTRACT

The disclosure illustrates a solar collector comprising an evacuated generally rectangular glass shell of a configuration commonly used for television tubes and a flat plate receiver having a black chrome surface positioned within the shell. A conduit in heat exchange relation to the plate has a single inlet and outlet for heat exchange fluid which extends through an insulating seal in the neck of the glass shell. This configuration permits a far greater collector surface area than prior evacuated cylindrical tube configurations.

6 Claims, 3 Drawing Figures

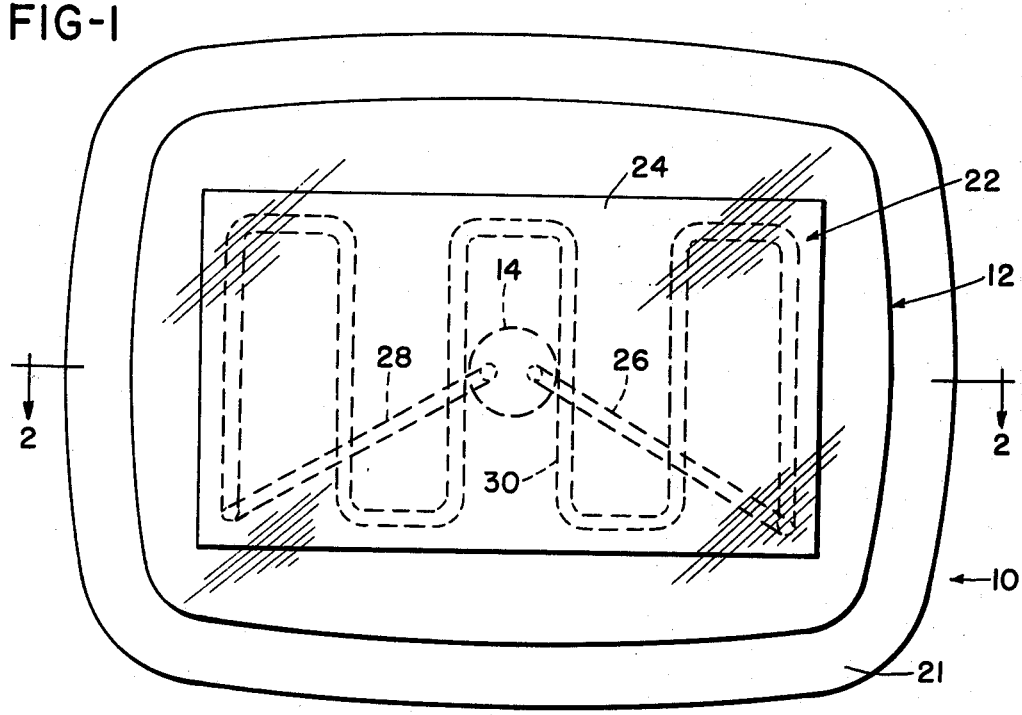
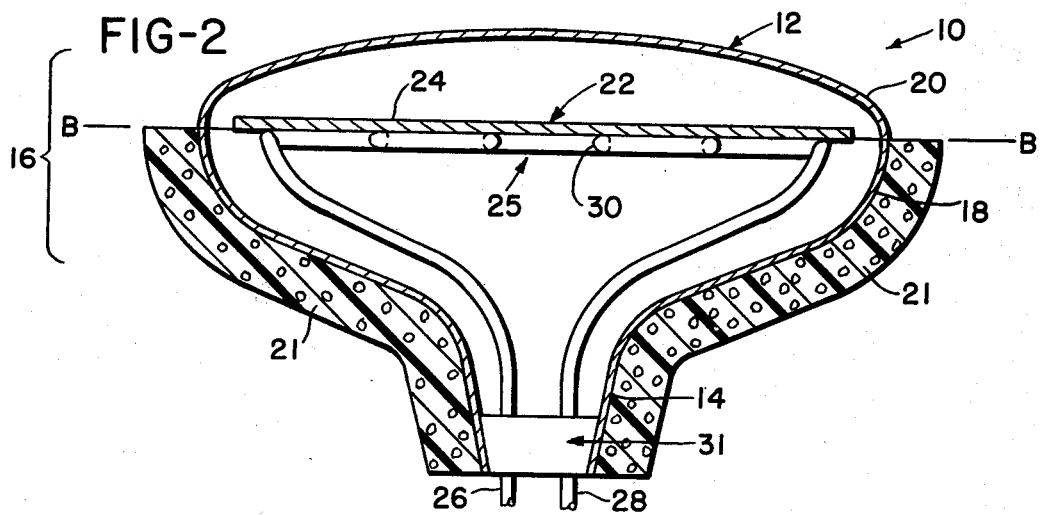
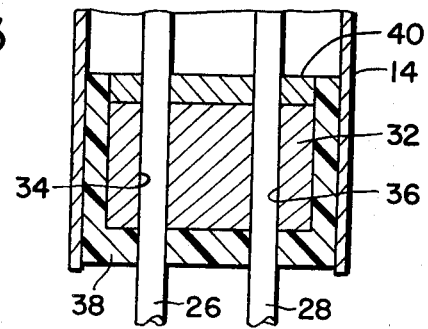

SOLAR ENERGY COLLECTOR

The present invention relates to solar energy collectors and more specifially to the type that are encased in an evacuated glass container.

One of the factors that detracts from the efficiency of a solar collector is the heat losses through radiation from the receiver. Usually, these losses are combated by insulating the faces of the collector that do not face the direction of solar radiation. Furthermore, the faces that receiver solar radiation have one or more sheets of material, usually glass, that is transparent to the short wave lengths of incoming solar radiation but which impedes the outflow of long wave length heat energy. Nonetheless, there are still heat losses through conduction and convection.

In an attempt to minimize these losses, it has been proposed to place the receiver within a glass container which is evacuated such as proposed in the U.S. Pat. Nos. to Godel et al 3,227,153, Meckler 4,027,653, and Hermann et al 4,142,509. These patents show the glass container to be in the form of tube sealed at both ends. While this construction solves the problem of convection losses, it has the disadvantage of a minimal surface area for an individual collector. As a result, these types of collectors must be utilized in arrays with connections between the collectors for the fluid that carries heat energy away from the collector to perform some useful purpose. The interconnections carry with them the penalty of additional heat losses which detract from the superior insulating properties of the evacuated containers.

The above problems are solved, in accordance with the present invention, by a flat plate collector consisting of a closed glass shell having a neck portion and in integral expanded generally rectangular portion extending in the direction of a plane normal to the longitudinal axis of the neck. A generally rectangular flat plate for receiving solar energy is contained within the rectangular portion and is formed from high conductivity material having a black chrome surface. A means is provided for forming passages for heat transfer fluid inducting a single inlet and outlet extending through the neck. An insulating seal is formed at the neck and the interior of the shell is evacuated to eliminate convection heat transfer.

The above and other related features of the present invention will be apparent from a reading of the following description of the disclosure shown in the accompanying drawing and the novelty thereof pointed out in the appended claims:

In the drawing:

FIG. 1 is a plan view of a solar collector embodying the present invention, the view being in the direction of the expected path of solar radiation.

FIG. 2 is a cross-section view of the collector of FIG. 1 taken in line 2—2 of FIG. 1 and, FIG. 3 is an enlarged portion of FIG. 2.

Referring to FIGS. 1, 2 and 3 there is shown a solar collector 10 of the flat plate type that is adapted to collect the total component of solar radiation i.e., diffuse as well as beam radiation. Collector 10 comprises a glass shell 12 having a generally tubular neck portion 14 integral with an integral expanded generally rectangular portion 16 that extends in the direction of a plane B—B that is normal to the longitudinal axis of the tube 14. The rectangular portion 16 consists of first and second halves 18,20 that are joined along the plane B—B as will be described later. It should be noted that the rectangular portion 16 has curved convex surfaces, as viewed from the exterior, in order to give it the strength to resist air pressure when its interior is evacuated.

A collector 22 in the form of a flat plate is positioned in the rectangular portion 16 so that its plane is generally parallel to the plane B—B. Collector 22 is formed from material having a high termal conductivity such as copper. The surface 24 of collector 22 that faces incoming solar radiation preferably is provided with a "black" coating such as black chrome to enhance the absorbance of solar energy radiation.

A system of fluid passages is (generally indicated at 24) provided for a suitable heat transfer fluid which carries heat away from the collector 22. The system comprises a single inlet conduit 26 and single outlet conduit 28, both extending through neck portion 14 to the exterior of collector 10. As illustrated, the inlet and outlet conduits 26, 28 are interconnected by a single conduit 30 intimately held in heat transfer relation to collector 22 and formed with a circultous path. Such a connection is provided by brazing or other means of fastening the two elements with a good structural bond having a relatively high heat transfer coefficient. It should be apparent that a multiplicity of conduits may be connected in parallel between the inlet and outlet conduits with similar results.

The inlet and outlet conduits 26 and 28 are maintained in the neck portion 14 by an insulating seal 30 comprising a ceramic plug 32 having holes 34, 36 through which the conduits 26, 28 respectively extend. Preferably the ceramic plug 32 is formed around the conduits. A seal 38 of silicon such as one made by Dow Corning is provided between the plug 32 and the wall of the neck portion 14 and around the exterior face of plug 32. The silicon provides an effective seal as well as providing a limited flexibility between the glass shell and the collector 22. A further seal is provided by a semi-liquid material 40 covering the interior face of plug 32. This material may be purchased from the General Electric Company under the trademark Glyptol. Other semi-liquid materials will give similar results.

For additional reduction of heat losses a layer of insulation 21, preferably expanded polyurethane, is provided around exterior of the neck portion 14 and the first half 18 of the rectangular portion, leaving only half 20 exposed to solar radiation. In order to mount the collector 10, lugs (not shown) may be provided on the glass shell. Alternatively, a suitable frame (also not shown) may embrace and support the perifery of the rectangular portion 16.

The glass shell 12 preferably is formed from the same glass tube used for the picture tube in television receivers. Thus, the high volume low unit cost technology of the electronics industry is made available for a low cost, substantial area flat plate collector. The glass shell 12 is fabricated using the same general techniques as used for television picture tubes. For example, the glass shell 12 is blown from molten glass as a one piece unit. It is then cut at plane B—B to form the halves 18 and 20. Once this is done the completed receiver 22 is set in place and the inlet/outlet tubes placed through neck 14. The halves 18 and 20 are secured around plane B—B by melting a seam of glass. Then, a vacuum is established within the glass shell 12 and the neck 14 sealed.

When the collector 10 is placed in position to receive solar radiation, a suitable heat transfer fluid is circulated through the system of fluid passages 22 to produce a useable heat output.

The apparatus described above provides a highly efficient and effective collector because it surrounds the receiver with a vacuum, but still enables a substantial surface area for the receiver. Furthermore, each collector 10 has but a single inlet and single outlet thereby reducing heat transfer losses after the fluid has been heated in the collector.

While a preferred embodiment of the present invention, it should be apparent to those skilled in the art that it may be practical in different forms without departing from the spirit and scope thereof.

Having thus described the invention, what is claimed as novel and desired to be secured by Letters Patent of the United States is:

1. A flat plate collector for solar energy, said collector comprising:
    a closed shell transparent to solar radiation and comprising a neck portion integrally connected with an expanded generally rectangular portion extending in the direction of a plane normal to the longitudinal axis of said neck portion;
    a generally rectangular copper plate positioned in said rectangular portion generally parallel to said plane, said rectangular plate being formed from high conductivity material having a black chrome surface on the side facing away from said neck for receiving solar radiation;
    conduit means forming passages for a heat transfer fluid, said conduit means being connected in heat transfer relation to said plate; said conduit means including a single inlet and a single outlet extending through said neck; and
    means for forming a gas tight seal between said inlet and outlet portions of said conduit means and the neck of said shell, said shell being substantially evacuated of air for minimizing heat loss from said plate;
    wherein said seal means comprises a ceramic plug through which said inlet and outlet of said conduit means extends,
    silicone insulating material between said plug and said glass, and a semi-liquid insulating material between the plug and the interior of said glass shell.

2. Apparatus as in claim 1 wherein said shell is formed from a television picture tube.

3. Apparatus as in claim 2 wherein said glass shell is formed from two sections jointed at a seam which generally lies in said plane.

4. Apparatus as in claim 1 wherein said conduit means comprises tube means connected in heat transfer relation to said plate.

5. Apparatus as in claim 4 wherein said tube means comprises a single tube extending through a circuitous path along one side of said plate.

6. Apparatus as in claim 1 further comprising insulating material around a portion of the exterior of said glass shell to permit exposure of one side of said plate to solar radiation.

* * * * *